United States Patent
Chiba

(10) Patent No.: US 11,187,295 B2
(45) Date of Patent: Nov. 30, 2021

(54) HOOK MEMBER AND TENSION SPRING

(71) Applicant: SAHARA CO., LTD., Iwate (JP)

(72) Inventor: Hiroki Chiba, Iwate (JP)

(73) Assignee: Sahara Co., Ltd., Ichinoseki (JP)

( * ) Notice: Subject to any disclaimer, the term of this patent is extended or adjusted under 35 U.S.C. 154(b) by 30 days.

(21) Appl. No.: 16/714,326

(22) Filed: Dec. 13, 2019

(65) Prior Publication Data

US 2020/0355233 A1 Nov. 12, 2020

(30) Foreign Application Priority Data

May 8, 2019 (JP) .............................. JP2019-088051

(51) Int. Cl.
*F16F 1/12* (2006.01)

(52) U.S. Cl.
CPC ....................... *F16F 1/12* (2013.01)

(58) Field of Classification Search
CPC ............... F16F 1/12; F16F 1/122; F16F 1/125
See application file for complete search history.

(56) References Cited

U.S. PATENT DOCUMENTS

| 273,695 A | * | 3/1883 | Knobeloch | F16F 1/122 267/177 |
| 2,028,122 A | * | 1/1936 | Floreth | F16F 1/125 267/73 |
| 2,400,425 A | * | 5/1946 | Liber | E04B 9/20 267/177 |
| 2,697,600 A | * | 12/1954 | Gregoire | F16F 1/125 267/287 |
| 3,169,757 A | * | 2/1965 | Roder | F16F 1/122 267/177 |
| 3,244,413 A | * | 4/1966 | Foster | F16F 1/125 267/170 |
| 4,162,063 A | * | 7/1979 | Nissen | A63B 5/11 182/139 |
| 4,549,859 A | * | 10/1985 | Andrione | F04B 39/127 248/624 |
| 4,712,778 A | * | 12/1987 | Newman | F16F 1/125 267/170 |
| 5,361,500 A | * | 11/1994 | Naslund | B27B 17/0033 30/381 |

(Continued)

FOREIGN PATENT DOCUMENTS

JP 2004-205025 A 7/2004

*Primary Examiner* — Thomas W Irvin
(74) *Attorney, Agent, or Firm* — Moser Taboada

(57) ABSTRACT

[Problems] Objects include providing a hook member that can be easily attached to a coil spring and providing a tension spring that includes the hook member.
[Solution] A hook member used for being attached to an end part of a coil spring in its axial direction is provided. The hook member includes a hook part for hooking a target member and an attachment part capable of being screwed with an outer circumferential surface and/or an inner circumferential surface of the coil spring. The attachment part has a sliding surface slidable with the outer circumferential surface and/or inner circumferential surface of the coil spring, and the sliding surface has a reverse shape of the outer circumferential surface and/or inner circumferential surface of at least the first turn constituting the coil spring.

7 Claims, 4 Drawing Sheets

(56) References Cited

U.S. PATENT DOCUMENTS

| | | | | |
|---|---|---|---|---|
| 6,041,905 | A * | 3/2000 | Fujimoto | F16F 1/125 192/205 |
| 6,457,922 | B1 * | 10/2002 | Tsai | F16B 13/0858 411/55 |
| 7,080,829 | B2 * | 7/2006 | Requet | F16F 1/122 267/175 |
| 7,357,380 | B2 * | 4/2008 | Menzel | B23D 47/005 188/378 |
| 7,530,194 | B1 * | 5/2009 | Wrape | A01K 83/00 43/26.1 |
| 2003/0062726 | A1 * | 4/2003 | Corbett | E05C 19/10 292/101 |
| 2005/0035513 | A1 * | 2/2005 | Requet | F16F 1/041 267/166 |
| 2012/0210542 | A1 * | 8/2012 | Yang | F16B 21/165 24/369 |
| 2018/0010662 | A1 * | 1/2018 | de Lima Zocca | F16F 1/06 |
| 2019/0128356 | A1 * | 5/2019 | Sonntag | F16F 1/06 |
| 2021/0239174 | A1 * | 8/2021 | Penner | F16F 1/125 |

\* cited by examiner

HOOK MEMBER AND TENSION SPRING

CROSS-REFERENCE TO RELATED APPLICATION

The present application is based on priority claimed on Japanese Patent Application No. 2019-088051, filed on May 8, 2019, the contents of which are incorporated herein by reference.

TECHNICAL FIELD

The present invention relates to a hook member and a tension spring that includes the hook member and, in particular, to a hook member that is used for being attached to an end part of a coil spring in its axial direction and a tension spring that includes a coil spring and a hook member or a pair of the hook members attached to one end part or both end parts of the coil spring in its axial direction.

BACKGROUND ART

A tension spring is usually used to bias target members to each other by hooking hook members provided at both end parts in the axial direction of the tension spring to the target members. Examples of such a tension spring include a spring having a structure in which, as illustrated in FIG. 4(b), both end parts of a coil spring in its axial direction are each inserted into two holes formed in a separately manufactured hook member and a spring having an integral structure in which, as disclosed in Patent Document 1, a coil spring and a hook member are made of different materials, holding parts are formed at respective end parts of the coil spring and the hook member, and the coil spring and the hook member are combined to obtain the integral structure.

The tension spring having a structure in which the hook member is attached to the coil spring, as described above, has an advantage that the lifetime of the coil spring itself is extended because the tension spring can withstand higher stress than a tension spring in which both end parts of a coil spring in its axial direction are raised to form hooks. On the other hand, to attach the hook member to the coil spring, it is necessary to pull the end part of the coil spring, which is provided without gaps, in the axial direction to create a certain gap, and then insert the end part of the coil spring along the holes or the holding part of the hook member, and there is thus a problem in that the cost is increased because the above operation is very time-consuming. Moreover, in the state in which the hook member is attached, a gap is generated between turns of the coil at the end part of the coil spring due to the holes or holding part of the hook member, and another problem therefore arises in that the effective number of turns of the coil spring (effective number of turns acting as a spring) decreases accordingly.

PRIOR ART DOCUMENTS

Patent Documents

[Patent Document 1] JP2004-205025A

SUMMARY OF THE INVENTION

Problems to be Solved by the Invention

The present invention has been made in consideration of such circumstances as described above and objects of the present invention include providing a hook member that can be easily attached to a coil spring and providing a tension spring that includes the hook member.

Means for Solving the Problems

To achieve the above objects, first, the present invention provides a hook member used for being attached to an end part of a coil spring in its axial direction, comprising: a hook part for hooking a target member; and an attachment part capable of being screwed with an outer circumferential surface of the coil spring, the attachment part having a sliding surface slidable with the outer circumferential surface of the coil spring, the sliding surface having a reverse shape of the outer circumferential surface of at least a first turn constituting the coil spring (Invention 1).

The number of turns of the coil spring is counted by how many times the wire material is turned from the start of winding, so the first turn of the coil spring refers to the first turn counted from the end of the wire material.

According to the invention (invention 1), the sliding surface of the attachment part has a reverse shape of the outer circumferential surface of at least the first turn constituting the coil spring; therefore, even in a state in which turns of the coil spring are kept in close contact with each other, the hook member can be easily attached to the coil spring simply by screwing the attachment part with the outer circumferential surface of the end part of the coil spring.

In a preferred embodiment of the above invention (Invention 1), the attachment part may be further capable of being screwed with an inner circumferential surface of the coil spring and may have a sliding surface slidable with the inner circumferential surface of the coil spring, and the sliding surface may have a reverse shape of the inner circumferential surface of at least the first turn constituting the coil spring (Invention 2).

According to the invention (Invention 2), the attachment part can be screwed not only with the outer circumferential surface of the coil spring but also with the inner circumferential surface of the coil spring, and the hook member can therefore be more firmly attached to the coil spring.

Second, the present invention provides a hook member used for being attached to an end part of a coil spring in its axial direction, comprising: a hook part for hooking a target member; and an attachment part capable of being screwed with an inner circumferential surface of the coil spring, the attachment part having a sliding surface slidable with the inner circumferential surface of the coil spring, the sliding surface having a reverse shape of the inner circumferential surface of at least a first turn constituting the coil spring (Invention 3).

According to the invention (invention 3), the sliding surface of the attachment part has a reverse shape of the inner circumferential surface of at least the first turn constituting the coil spring; therefore, even in a state in which turns of the coil spring are kept in close contact with each other, the hook member can be easily attached to the coil spring simply by screwing the attachment part with the inner circumferential surface of the end part of the coil spring.

In a preferred embodiment of the above invention (Invention 1 to 3), the attachment part may be in a flat plate-like shape extending in a direction identical to the axial direction of the coil spring (Invention 4).

According to the invention (Invention 4), the manufacturing process can be simplified as compared with a case of manufacturing a hook member including an attachment part of a three-dimensional shape such as a hollow cylindrical shape, and it is therefore possible to suppress the manufacturing cost and achieve weight reduction, thus improving the handling properties.

Third, the present invention provides a tension spring comprising: a coil spring; and a hook member or a pair of the hook members attached to one end part or both end parts of the coil spring in its axial direction, the hook member having: a hook part for hooking a target member; and an attachment part capable of being screwed with an outer circumferential surface of the coil spring, the attachment part having a sliding surface slidable with the outer circumferential surface of the coil spring, the sliding surface having a reverse shape of the outer circumferential surface of at least a first turn constituting the coil spring (Invention 5).

According to the invention (invention 5), even in a state in which turns of the coil spring are kept in close contact with each other, the hook member can be easily attached to the coil spring simply by screwing the attachment part of the hook member with the outer circumferential surface of the end part of the coil spring, and it is therefore possible to reduce the manufacturing time for the tension spring as a whole and suppress the manufacturing cost. Moreover, no gaps are formed between the turns of the coil spring even in the state in which the hook member is attached, and it is therefore possible to increase the effective number of turns of the coil spring as compared with the conventional tension spring, thus reducing the amount of strain. This can improve the durability of the tension spring.

In a preferred embodiment of the above invention (Invention 5), the attachment part of the hook member may be further capable of being screwed with an inner circumferential surface of the coil spring and may have a sliding surface slidable with the inner circumferential surface of the coil spring, and the sliding surface may have a reverse shape of the inner circumferential surface of at least the first turn constituting the coil spring (Invention 6).

According to the invention (Invention 6), the attachment part of the hook member can be screwed not only with the outer circumferential surface of the coil spring but also with the inner circumferential surface of the coil spring, and the attachment of the hook member to the coil spring can therefore be made more firm.

In a preferred embodiment of the above invention (Invention 5 to 6), the attachment part of the hook member may be in a flat plate-like shape extending in a direction identical to the axial direction of the coil spring (Invention 7).

According to the invention (Invention 7), the manufacturing process for the hook member can be simplified as compared with a case of manufacturing a hook member including an attachment part of a three-dimensional shape such as a hollow cylindrical shape, and it is therefore possible to suppress the manufacturing cost for the tension spring as a whole and achieve weight reduction of the hook member, thus improving the handling properties of the tension spring as a whole.

Fourth, the present invention provides a tension spring comprising: a coil spring; and a hook member or a pair of the hook members attached to one end part or both end parts of the coil spring in its axial direction, the hook member having: a hook part for hooking a target member; and an attachment part capable of being screwed with an inner circumferential surface of the coil spring, the attachment part having a sliding surface slidable with the inner circumferential surface of the coil spring, the sliding surface having a reverse shape of the inner circumferential surface of at least a first turn constituting the coil spring (Invention 8).

According to the invention (invention 8), even in a state in which turns of the coil spring are kept in close contact with each other, the hook member can be easily attached to the coil spring simply by screwing the attachment part of the hook member with the inner circumferential surface of the end part of the coil spring, and it is therefore possible to reduce the manufacturing time for the tension spring as a whole and suppress the manufacturing cost. Moreover, no gaps are formed between the turns of the coil spring even in the state in which the hook member is attached, and it is therefore possible to increase the effective number of turns of the coil spring as compared with the conventional tension spring, thus reducing the amount of strain. This can improve the durability of the tension spring.

In a preferred embodiment of the above invention (Invention 8), the attachment part of the hook member may be in a flat plate-like shape extending in a direction identical to the axial direction of the coil spring (Invention 9).

According to the invention (Invention 9), the manufacturing process for the hook member can be simplified as compared with a case of manufacturing a hook member including an attachment part of a three-dimensional shape such as a hollow cylindrical shape, and it is therefore possible to suppress the manufacturing cost for the tension spring as a whole and achieve weight reduction of the hook member, thus improving the handling properties of the tension spring as a whole.

In a preferred embodiment of the above invention (Invention 5 to 7), the end part or end parts of the coil spring in its axial direction may be swaged and fixed to the attachment part or attachment parts of the hook member or hook members (Invention 10).

According to the invention (Invention 10), it is possible to prevent the hook member or hook members from being detached from the coil spring even during a long-time operation.

Advantageous Effect of the Invention

According to the hook member of the present invention, the sliding surface of the attachment part has a reverse shape of the outer circumferential surface and/or inner circumferential surface of at least the first turn constituting the coil spring; therefore, even in a state in which turns of the coil spring are kept in close contact with each other, the hook member can be easily attached to the coil spring simply by screwing the attachment part with the outer circumferential surface and/or inner circumferential surface of the end part of the coil spring. Moreover, according to the tension spring of the present invention (invention 5), even in a state in which turns of the coil spring are kept in close contact with each other, the hook member can be easily attached to the coil spring simply by screwing the attachment part of the hook member with the outer circumferential surface of the end part of the coil spring, and it is therefore possible to reduce the manufacturing time for the tension spring as a whole and suppress the manufacturing cost. Moreover, according to the tension spring of the present invention, even in a state in which turns of the coil spring are kept in close contact with each other, the hook member can be easily attached to the coil spring simply by screwing the attachment part with the outer circumferential surface and/or inner circumferential surface of the end part of the coil spring, and it is therefore possible to reduce the manufacturing time for the tension spring as a whole and suppress the manufacturing cost. Furthermore, no gaps are formed between the turns of the coil spring even in the state in which the hook member is attached, and it is therefore possible to increase the effective number of turns of the coil spring as compared with the conventional tension spring, thus reducing the amount of strain. This can improve the durability of the tension spring.

EMBODIMENTS FOR CARRYING OUT THE INVENTION

Figure 1A:
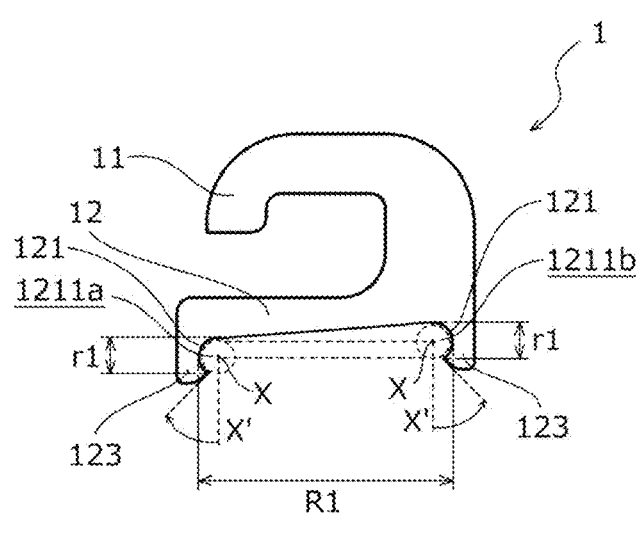
FIG. 1(*a*) is a central longitudinal cross-sectional view of a hook member according to a first embodiment of the present invention and FIG. 1(*b*) is a central longitudinal cross-sectional view of a tension spring including the hook member of FIG. 1(*a*).

Hereinafter, embodiments of the hook member and the tension spring including the hook member according to the present invention will be described with reference to the drawings as appropriate. The embodiments described below are for facilitating the understanding of the present invention and do not limit the present invention.

First Embodiment

A hook member and a tension spring including the hook member according to the first embodiment will be described with reference to FIGS. 1(*a*) and 1(*b*). FIG. 1(*a*) is a central longitudinal cross-sectional view of a hook member 1 and FIG. 1(*b*) is a central longitudinal cross-sectional view of a tension spring 10 including the hook member 1 of FIG. 1(*a*). In FIG. 1(*b*), a coil spring 4 is illustrated by omitting a part of the coil spring 4 on the lower side in the axial direction.
<Hook Member>

The hook member 1, which is used for being attached to an end part of the coil spring 4 in its axial direction, includes a hook part 11 for hooking a target member and an attachment part 12 capable of being screwed with an outer circumferential surface 41 of the coil spring 4.

The hook part 11 of the hook member 1 may have an approximate C-shape as illustrated in FIG. 1(*a*), but the shape of the hook part 11 is not particularly limited, provided that the hook part 11 can hook a target member. For example, the hook part 11 may be in a circular shape.

In the first embodiment, the attachment part 12 of the hook member 1 may be in a hollow cylindrical shape extending in the same direction as the axial direction of the coil spring 4. The attachment part 12 has a sliding surface 121 slidable with the outer circumferential surface 41 of the coil spring 4, and the sliding surface 121 has a reverse shape of an outer circumferential surface 411 of the first turn constituting the coil spring 4. The number of turns of the coil spring is counted by how many times the wire material is turned from the start of winding, so the first turn of the coil spring 4 refers to the first turn counted from the end of the wire material.

The reverse shape of the outer circumferential surface 411 of the first turn constituting the coil spring 4 means a shape that engages with the outer circumferential surface 411 of the first turn of the coil spring 4, that is, an irregular shape obtained by reversing the outer shape so that the irregular shape can be screwed with the outer circumferential surface 411 of the first turn of the coil spring 4. The sliding surface 121 of the attachment part 12 may have the above reverse shape at the sliding surface 121 as a whole or at a part of the sliding surface 121, provided that the sliding surface 121 can be screwed with the outer circumferential surface 411 of the first turn of the coil spring 4.

In the first embodiment, as described above, the attachment part 12 of the hook member 1 may be in a hollow cylindrical shape extending in the same direction as the axial direction of the coil spring 4. The hollow cylindrical shape of the attachment part 12 of the hook member 1 allows the coil spring 4 to be applied with a uniform load even when the weight of a target member to be hooked on the hook member 1 is large, and the durability of the coil spring 4 can thus be improved.

As described above, in the first embodiment, the attachment part 12 of the hook member 1 may be in a hollow cylindrical shape, but the shape of the other portion is not particularly limited, provided that the sliding surface 121 slidable with the outer circumferential surface 41 of the coil spring 4 has a shape that engages with the outer circumferential surface 411 of the first turn constituting the coil spring 4 so that the shape can be screwed with the outer circumferential surface 41 of the coil spring 4. For example, the other portion than the attachment part 12 of the hook member 1 may be in any of various shapes, such as a flat plate-like shape extending in the same direction as the axial direction of the coil spring 4, a cross shape obtained by combining flat shapes in the axial direction, and a radial shape like umbrella ribs.

When the attachment part 12 of the hook member 1 is in a flat plate-like shape extending in the same direction as the axial direction of the coil spring 4, the manufacturing process can be simplified as compared with a case of manufacturing a hook member 1 including an attachment part 12 of a three-dimensional shape such as a hollow cylindrical shape, and it is therefore possible to suppress the manufacturing cost and achieve weight reduction. Moreover, when the hook member 1 as a whole including the hook part 11 and the attachment part 12 is in a flat plate-like shape extending in the same direction as the axial direction of the coil spring 4, it is possible to further simplify the manufacturing process and achieve further weight reduction.

As described above, the attachment part 12 of the hook member 1 can be screwed with the outer circumferential surface 41 of the coil spring 4; therefore, when the hook member 1 as a whole is in a flat plate-like shape extending in the same direction as the axial direction of the coil spring 4, the hook member 1 is in a flat plate-like shape that passes coaxially with the axial center of the coil spring 4 and has the same shape as the central longitudinal cross-sectional shape of the hook member 1 as illustrated in FIG. 1(*a*). In this case, the attachment part 12 of the hook member 1 has sliding surfaces 121 slidable with the outer circumferential surface 41 of the coil spring 4, and the sliding surfaces 121 have a shape that engages with the outer circumferential surface 411 of the first turn constituting the coil spring 4; therefore, the hook member 1 can be attached to the coil spring 4 by simply screwing the attachment part 12 with the outer circumferential surface 41 of the coil spring 4 while rotating the hook member 1.

When the attachment part 12 of the hook member 1 or the hook member 1 as a whole is in a flat plate-like shape extending in the same direction as the axial direction of the coil spring 4, the thickness of the flat plate portion can be appropriately set in accordance with a wire diameter d, an outer diameter Do, and a total number of turns of the coil spring 4 to be attached. For example, in the hook member 1 attached to the coil spring 4 having a wire diameter d of 1.08 mm, an outer diameter Do of 8.3 mm, and a total number of turns of 40, the flat plate portion may preferably have a thickness of about 2 to 3 mm.

In the first embodiment, a radial dimension R1 of the sliding surface 121 of the hook member 1 may be approximately the same as the outer diameter Do of the coil spring 4, and when the dimensional tolerance is Δ, the dimension R1 may be represented as R1=the outer diameter Do+ the dimensional tolerance Δ+ about 0.15 to 0.2. In the axial direction, a maximum dimension r1 of a recessed part 1211 formed by the sliding surface 121 of the hook member 1 may be approximately the same as the wire diameter d of the coil spring 4, and when the dimensional tolerance is Δ, the maximum dimension r1 may be represented as r1=the wire diameter d+ the dimensional tolerance Δ+ about 0.15 to 0.2. When the recessed part 1211 includes a left-side recessed part 1211a and a right-side recessed part 1211b in the central longitudinal cross-sectional view, the left-side recessed part 1211a may be disposed below the right-side recessed part 1211b in the axial direction with an elevational step corresponding to about half the wire diameter d of the coil spring 4.

The attachment part 12 of the hook member 1 may be formed with an end part 123 on the coil spring 4 side. The end part 123 has a so-called interference avoidance shape such that the second and subsequent turns of the coil spring 4 do not come into contact with the end part 123 when the spring is expanded and contracted. The interference avoidance shape refers, for example, to a shape in which a chamfer or an R surface is provided around the end part 123 on the coil spring 4 side of the attachment part 12. In the first embodiment, as illustrated in FIG. 1(a), a chamfered shape is employed as the interference avoidance shape of the end part 123. When a line drawn downward in the axial direction from a line diameter center X of the first turn of the coil spring 4 corresponding to the sliding surface 121 is represented by a perpendicular line X', the chamfered shape is cut out at an angle of about 45 degrees radially outward from the line diameter center X with reference to the perpendicular line X'.

As a material of the hook member 1, for example, a metal, an alloy, a resin, or other appropriate material can be used, but from the viewpoint of the strength, a metal or an alloy may be preferred, and a stainless steel-based alloy may be particularly preferred. When an end part of the coil spring 4 in its axial direction is swaged and fixed to the attachment part 12 of the hook member 1 in the tension spring 10 as will be described later, the material of the hook member 1 may be preferably a metal or an alloy that can readily be plastically deformed and particularly preferably a copper-zinc-based alloy.

<Coil Spring>

Figure 1B:
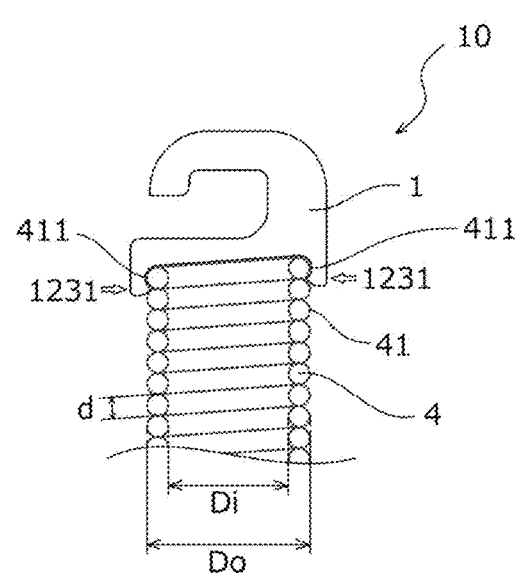

In the first embodiment, as illustrated in FIG. 1(b), the coil spring 4 may be formed by winding a metal wire material having a wire diameter d in a spiral manner with an outer diameter Do around a certain central axis so that turns of the wire material are in close contact with each other. The turns of the coil may be in close contact with each other in a state in which the tensile force is not applied from external, unlike a compression coil spring that generates repulsion force when receiving a load in the direction in which the spring compresses. The total number of turns of the coil spring 4 can be appropriately set as necessary. For example, the coil spring 4 having a wire diameter d of 1.08 mm and an outer diameter Do of 8.3 mm may preferably have a total number of turns of about 40.

The use of the hook member 1 in the present embodiment allows the effective number of turns of the coil spring 4 to be increased as compared with the conventional tension spring because no gaps are formed between the turns of the coil spring 4 not only when the hook member 1 is attached but also after the hook member 1 is attached.

<Tension Spring>

The tension spring 10 includes the coil spring 4 and the hook member 1 or a pair of the hook members 1 attached to one end part or both end parts of the coil spring 4 in its axial direction. As described above, the hook member 1 has the attachment part 12 capable of being screwed with the outer circumferential surface 41 of the coil spring 4, the attachment part 12 has the sliding surface 121 slidable with the outer circumferential surface 41 of the coil spring 4, and the sliding surface 121 has a reverse shape of the outer circumferential surface 411 of the first turn constituting the coil spring 4; therefore, the hook member 1 can be attached to the coil spring 4 simply by screwing the attachment part 12 of the hook member 1 with the outer circumferential surface 41 of the coil spring 4. Thus, according to the tension spring 10, even in a state in which turns of the coil spring 4 are kept in close contact with each other, the hook member 1 can be attached to the coil spring 4, and it is therefore possible to reduce the manufacturing time and suppress the manufacturing cost. That is, the hook member 1 may not have a portion interposed between two successive turns of the coil in the state of being attached to the coil spring 4.

In the tension spring 10, the end part or end parts of the coil spring 4 in its axial direction may preferably be swaged and fixed to the attachment part or attachment parts 12 of the hook member or hook members 1. The swage fixation refers to a method of fixing a member (e.g., a metal member) that may readily be plastically deformed to another member by applying pressure to that member to deform it. The swage fixation can be performed, for example, using a tool such as a swage tool. In the first embodiment, the swage fixation may be performed by pressing a swage part or swage parts 1231 toward the axial center from the outside in the radial direction. The swage part or swage parts 1231 are located at the end part or end parts 123 of each attachment part 12 of the hook member 1 on the coil spring 4 side and correspond to the boundary between the first turn and the second turn of the coil spring 4. In the central longitudinal cross-sectional view, the swage part or swage parts 1231 may be disposed on the lower side in the axial direction with an elevational step corresponding to about half the wire diameter d of the coil spring 4. Thus, the end part or end parts of the coil spring 4 in its axial direction may be swaged and fixed to the attachment part or attachment parts 12 of the hook member or hook members 1, and it is thereby possible to prevent the hook member or hook members 1 from being detached from the coil spring 4 even during a long-time operation.

Second Embodiment

Figure 2A:
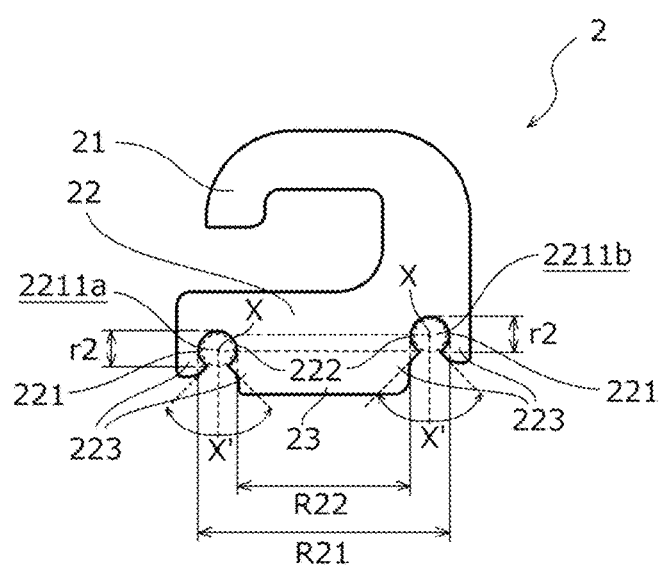
FIG. 2(*a*) is a central longitudinal cross-sectional view of a hook member according to a second embodiment of the present invention and FIG. 2(*b*) is a central longitudinal cross-sectional view of a tension spring including the hook member of FIG. 2(*a*).
Figure 2B:
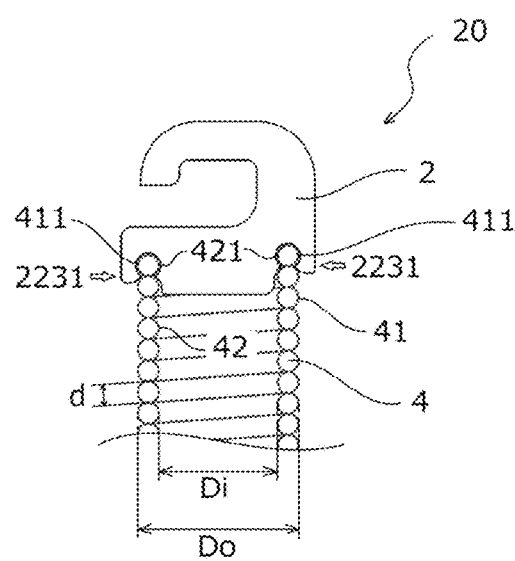

A hook member and a tension spring including the hook member according to the second embodiment will then be described with reference to FIGS. 2(a) and 2(b). FIG. 2(a) is a central longitudinal cross-sectional view of a hook member 2 and FIG. 2(b) is a central longitudinal cross-sectional view of a tension spring 20 including the hook member 2 of FIG. 2(a). In FIG. 2(b), a coil spring 4 is illustrated by omitting a part of the coil spring 4 on the lower side in the axial direction.

The second embodiment is different from the first embodiment in that the hook member includes an attachment part that is further capable of being screwed with the inner circumferential surface of the coil spring. Other configurations are substantially the same as those in the first embodiment, so the configurations substantially the same as those in the first embodiment are denoted by the same reference numerals and the description thereof will be omitted.

<Hook Member>

The hook member 2, which is used for being attached to an end part of the coil spring 4 in its axial direction, includes a hook part 21 for hooking a target member and an attachment part 22 capable of being screwed with an outer circumferential surface 41 and an inner circumferential surface 42 of the coil spring 4.

The hook part 21 of the hook member 2 may have an approximate C-shape as illustrated in FIG. 2(a), but the shape of the hook part 21 is not particularly limited, provided that the hook part 21 can hook a target member. For example, the hook part 21 may be in a circular shape.

In the second embodiment, the attachment part 22 of the hook member 2 may be in a hollow cylindrical shape extending in the same direction as the axial direction of the coil spring 4 and may have a protrusion part 23 inside the attachment part 22. The protrusion part 23 may be in an approximately solid cylindrical shape extending downward in the axial direction. The attachment part 22 of the hook member 2 has a sliding surface 221 slidable with the outer circumferential surface 41 of the coil spring 4, and the sliding surface 221 has a reverse shape of an outer circumferential surface 411 of the first turn constituting the coil spring 4. The attachment part 22 of the hook member 2 further has a sliding surface 222 slidable with the inner circumferential surface 42 of the coil spring 4, and the sliding surface 222 has a reverse shape of an inner circumferential surface 421 of the first turn constituting the coil spring 4. As illustrated in FIG. 2(a), the sliding surface 222 is located on the outer circumferential surface of the protrusion part 23; therefore, when the hook member 2 is attached to the coil spring 4, the protrusion part 23 is screwed with the inner circumferential surface 42 of the coil spring 4.

The reverse shape of the outer circumferential surface 411 of the first turn constituting the coil spring 4 means a shape that engages with the outer circumferential surface 411 of the first turn of the coil spring 4, that is, an irregular shape obtained by reversing the outer shape so that the irregular shape can be screwed with the outer circumferential surface 411 of the first turn of the coil spring 4. The sliding surface 221 of the attachment part 22 may have the above reverse shape at the sliding surface 221 as a whole or at a part of the sliding surface 221, provided that the sliding surface 221 can be screwed with the outer circumferential surface 411 of the first turn of the coil spring 4.

The reverse shape of the inner circumferential surface 421 of the first turn constituting the coil spring 4 means a shape that engages with the inner circumferential surface 421 of the first turn of the coil spring 4, that is, an irregular shape obtained by reversing the outer shape so that the irregular shape can be screwed with the inner circumferential surface 421 of the first turn of the coil spring 4. The sliding surface 222 of the attachment part 22 may have the above reverse shape at the sliding surface 222 as a whole or at a part of the sliding surface 222, provided that the sliding surface 222 can be screwed with the inner circumferential surface 421 of the first turn of the coil spring 4.

In the second embodiment, as described above, the attachment part 22 of the hook member 2 may be in a hollow cylindrical shape extending in the same direction as the axial direction of the coil spring 4 and may have the protrusion part 23 inside the attachment part 22, and the protrusion part 23 may be in an approximately solid cylindrical shape extending downward in the axial direction. The hollow cylindrical shape of the attachment part 22 of the hook member 2 having the protrusion part 23 inside the attachment part 22 allows the coil spring 4 to be applied with a uniform load even when the weight of a target member to be hooked on the hook member 2 is large, and the durability of the coil spring 4 can thus be improved. Moreover, the attachment part 22 can be screwed not only with the outer circumferential surface 41 of the coil spring 4 but also with the inner circumferential surface 42 of the coil spring 4, and the hook member 2 can therefore be more firmly attached to the coil spring 4.

As described above, in the second embodiment, the attachment part 22 of the hook member 2 may be in a hollow cylindrical shape having the protrusion part 23 inside the attachment part 22, but the shape of the other portion is not particularly limited, provided that the sliding surface 221 slidable with the outer circumferential surface 41 of the coil spring 4 has a shape that engages with the outer circumferential surface 411 of the first turn constituting the coil spring 4 so that the shape can be screwed with the outer circumferential surface 41 of the coil spring 4 and the sliding surface 222 slidable with the inner circumferential surface 42 of the coil spring 4 has a shape that engages with the inner circumferential surface 421 of the first turn constituting the coil spring 4 so that the shape can also be screwed with the inner circumferential surface 42 of the coil spring 4. For example, the other portion than the attachment part 22 of the hook member 2 may be in any of various shapes, such as a flat plate-like shape extending in the same direction as the axial direction of the coil spring 4, a cross shape obtained by combining flat shapes in the axial direction, and a radial shape like umbrella ribs.

When the attachment part 22 of the hook member 2 is in a flat plate-like shape extending in the same direction as the axial direction of the coil spring 4, the manufacturing process can be simplified as compared with a case of manufacturing a hook member 2 including an attachment part 22 of a three-dimensional shape such as a hollow cylindrical shape, and it is therefore possible to suppress the manufacturing cost and achieve weight reduction. Moreover, when the hook member 2 as a whole including the hook part 21 and the attachment part 22 is in a flat plate-like shape extending in the same direction as the axial direction of the coil spring 4, it is possible to further simplify the manufacturing process and achieve further weight reduction.

As described above, the attachment part 22 of the hook member 2 can be screwed with the outer circumferential surface 41 and inner circumferential surface 42 of the coil spring 4; therefore, when the hook member 2 as a whole is in a flat plate-like shape extending in the same direction as the axial direction of the coil spring 4, the hook member 2 is in a flat plate-like shape that passes coaxially with the axial center of the coil spring 4 and has the same shape as the central longitudinal cross-sectional shape of the hook member 2 as illustrated in FIG. 2(a). In this case, the attachment part 22 of the hook member 2 has sliding surfaces 221 slidable with the outer circumferential surface 41 of the coil spring 4, and the sliding surfaces 221 have a shape that engages with the outer circumferential surface 411 of the first turn constituting the coil spring 4, while the attachment part 22 of the hook member 2 has sliding surfaces 222 slidable with the inner circumferential surface 42 of the coil spring 4, and the sliding surfaces 222 have a shape that engages with the inner circumferential surface 421 of the first turn constituting the coil spring 4; therefore, the hook member 2 can be attached to the coil spring 4 by simply screwing the attachment part 22 with the outer circumferential surface 41 and inner circumferential surface 42 of the coil spring 4 while rotating the hook member 2.

When the attachment part 22 of the hook member 2 or the hook member 2 as a whole is in a flat plate-like shape extending in the same direction as the axial direction of the coil spring 4, the thickness of the flat plate portion can be appropriately set in accordance with a wire diameter d, an outer diameter Do, and a total number of turns of the coil spring 4 to be attached. For example, in the hook member 2 attached to the coil spring 4 having a wire diameter d of 1.08 mm, an outer diameter Do of 8.3 mm, and a total number of turns of 40, the flat plate portion may preferably have a thickness of about 2 to 3 mm.

In the second embodiment, a radial dimension R21 of the sliding surface 221 of the hook member 2 may be approximately the same as the outer diameter Do of the coil spring 4, and when the dimensional tolerance is Δ, the dimension R21 may be represented as R21=the outer diameter Do+ the dimensional tolerance Δ+ about 0.15 to 0.2. A radial dimension R22 of the sliding surface 222 of the hook member 2 may be approximately the same as an inner diameter Di of the coil spring 4, and when the dimensional tolerance is Δ, the dimension R22 may be represented as R22=the inner diameter Di+ the dimensional tolerance Δ+ about 0.15 to 0.2.

In the axial direction, a maximum dimension r2 of a recessed part 2211 formed by the sliding surface 221 and sliding surface 222 of the hook member 2 may be approximately the same as the wire diameter d of the coil spring 4, and when the dimensional tolerance is Δ, the maximum dimension r2 may be represented as r2=the wire diameter d+ the dimensional tolerance Δ+ about 0.15 to 0.2. When the recessed part 2211 includes a left-side recessed part 2211a and a right-side recessed part 2211b in the central longitudinal cross-sectional view, the left-side recessed part 2211a may be disposed below the right-side recessed part 2211b in the axial direction with an elevational step corresponding to about half the wire diameter d of the coil spring 4.

In the hook member 2, the attachment part 22 may be formed with an end part 223 on the coil spring 4 side. The end part 223 encompasses the protrusion part 23 and has a so-called interference avoidance shape such that the second and subsequent turns of the coil spring 4 do not come into contact with the end part 223 when the spring is expanded and contracted. The interference avoidance shape refers, for example, to a shape in which a chamfer or an R surface is provided around the end part 223 on the coil spring 4 side of the attachment part 22. In the second embodiment, as illustrated in FIG. 2(a), a chamfered shape is employed as the interference avoidance shape of the end parts 223. When a line drawn downward in the axial direction from a line shape center X of the first turn of the coil spring 4 corresponding to the recessed part 2211 formed by the sliding surface 221 and the sliding surface 222 is represented by a perpendicular line X', the chamfered shape is cut out at an angle of about 45 degrees radially outward and inward from the line diameter center X with reference to the perpendicular line X'.

As a material of the hook member 2, for example, a metal, an alloy, a resin, or other appropriate material can be used, but from the viewpoint of the strength, a metal or an alloy may be preferred, and a stainless steel-based alloy may be particularly preferred. When an end part of the coil spring 4 in its axial direction is swaged and fixed to the attachment part 22 of the hook member 2 in the tension spring 20 as will be described later, the material of the hook member 1 may be preferably a metal or an alloy that can readily be plastically deformed and particularly preferably a copper-zinc-based alloy.

<Coil Spring>

Figure 4A:
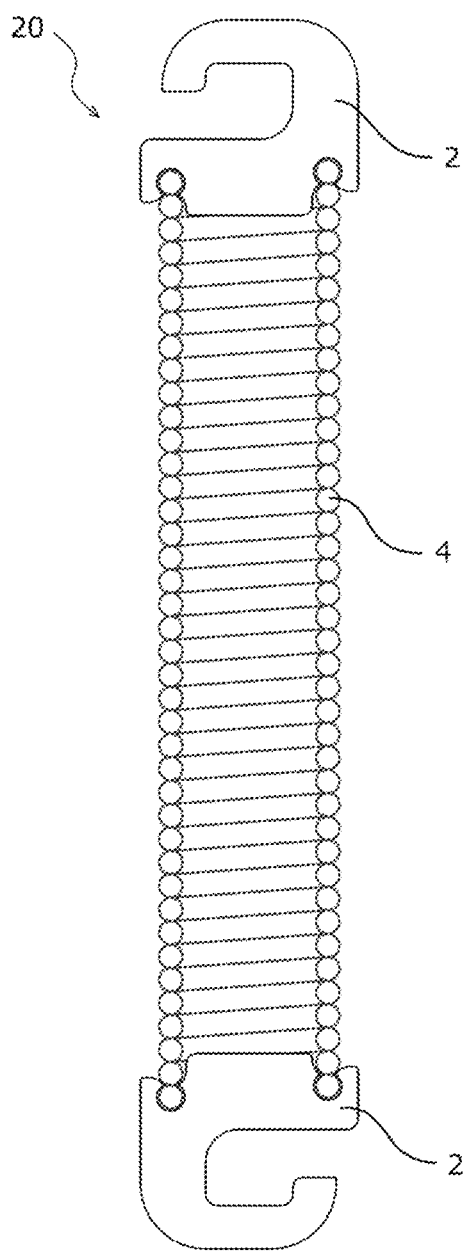
FIG. 4(*a*) is a central longitudinal cross-sectional view of the tension spring of FIG. 2(*b*) including a coil spring having a total number of turns of 40 and FIG. 4(*b*) is a central longitudinal cross-sectional view of a conventional tension spring including a coil spring having the same total number of turns as that in FIG. 4(*a*).
Figure 4B:
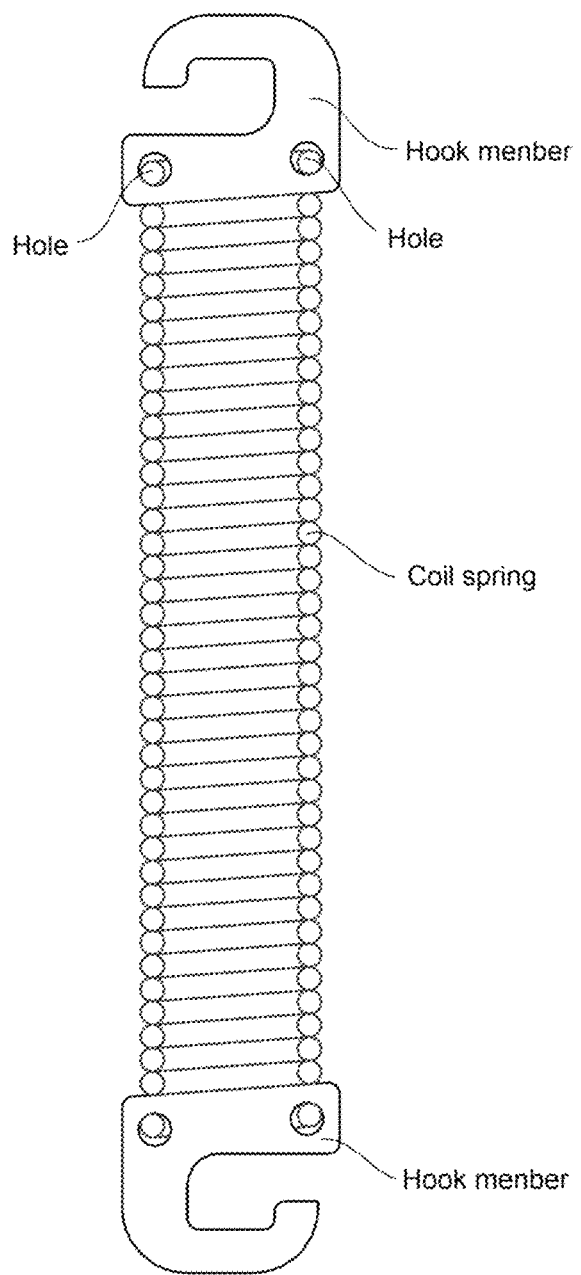

In the second embodiment, the coil spring 4 is common to that in the first embodiment, so the description thereof will be omitted. FIG. 4(a) is a central longitudinal cross-sectional view of the tension spring 20 of the second embodiment including the hook member 2 and the coil spring 4 having a total number of turns of 40 and FIG. 4(b) is a central longitudinal cross-sectional view of a conventional tension spring including a coil spring having the same total number of turns as that in FIG. 4(a). As apparent from FIGS. 4(a) and 4(b), the use of the hook member 2 in the present embodiment allows the effective number of turns of the coil spring 4 to be increased as compared with the conventional tension spring because no gaps are formed between the turns of the coil spring 4 not only when the hook member 2 is attached but also after the hook member 2 is attached.

<Tension Spring>

The tension spring 20 includes the coil spring 4 and the hook member 2 or a pair of the hook members 2 attached to one end part or both end parts of the coil spring 4 in its axial direction. As described above, the hook member 2 has the attachment part 22 capable of being screwed with the outer circumferential surface 41 and inner circumferential surface 42 of the coil spring 4, the attachment part 22 has the sliding surface 221 slidable with the outer circumferential surface 41 of the coil spring 4, and the sliding surface 221 has a reverse shape of the outer circumferential surface 411 of the first turn constituting the coil spring 4, while the attachment part 22 has the sliding surface 222 slidable with the inner circumferential surface 42 of the coil spring 4 and the sliding surface 222 has a reverse shape of the inner circumferential surface 421 of the first turn constituting the coil spring 4; therefore, the hook member 2 can be attached to the coil spring 4 simply by screwing the attachment part 22 of the hook member 2 with the outer circumferential surface 41 and inner circumferential surface 42 of the coil spring 4. Thus, according to the tension spring 20, even in a state in which turns of the coil spring 4 are kept in close contact with each other, the hook member 2 can be attached to the coil spring 4, and it is therefore possible to reduce the manufacturing time and suppress the manufacturing cost. Moreover, the attachment part 22 can be screwed not only with the outer circumferential surface 41 of the coil spring 4 but also with the inner circumferential surface 42 of the coil spring 4, and the hook member 2 can therefore be more firmly attached to the coil spring 4. That is, also in the second embodiment, the hook member 2 may not have a portion interposed between two successive turns of the coil in the state of being attached to the coil spring 4.

In the tension spring 20, the end part or end parts of the coil spring 4 in its axial direction may preferably be swaged and fixed to the attachment part or attachment parts 22 of the hook member or hook members 2. In the second embodiment, the swage fixation may be performed by pressing a swage part or swage parts 2231 toward the axial center from the outside in the radial direction. The swage part or swage parts 2231 are located at the end part or end parts 223 of each attachment part 22 of the hook member 2 on the coil spring 4 side and correspond to the boundary between the first turn and the second turn of the coil spring 4. In the central longitudinal cross-sectional view, the swage part or swage parts 2231 may be disposed on the lower side in the axial direction with an elevational step corresponding to about half the wire diameter d of the coil spring 4. Thus, the end part or end parts of the coil spring 4 in its axial direction may be swaged and fixed to the attachment part or attachment parts 22 of the hook member or hook members 2, and it is thereby possible to prevent the hook member or hook members 2 from being detached from the coil spring 4 even during a long-time operation.

Third Embodiment

Figure 3A:
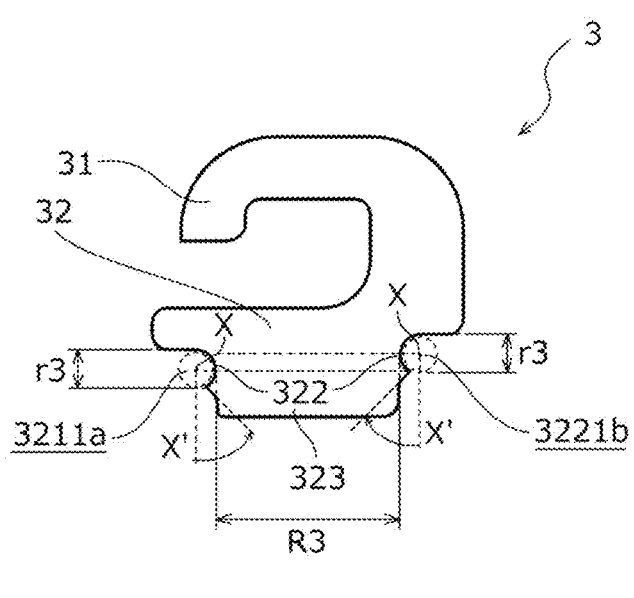
FIG. 3(*a*) is a central longitudinal cross-sectional view of a hook member according to a third embodiment of the present invention and FIG. 3(*b*) is a central longitudinal cross-sectional view of a tension spring including the hook member of FIG. 3(*a*).
Figure 3B:
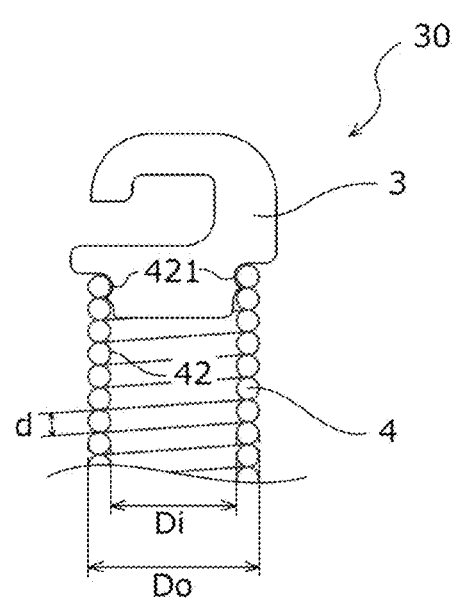

A hook member and a tension spring including the hook member according to the third embodiment will then be described with reference to FIGS. 3(a) and 3(b). FIG. 3(a) is a central longitudinal cross-sectional view of a hook member 3 and FIG. 3(b) is a central longitudinal cross-sectional view of a tension spring 30 including the hook member 3 of FIG. 3(a). In FIG. 3(b), a coil spring 4 is illustrated by omitting a part of the coil spring 4 on the lower side in the axial direction.

While the first embodiment includes the attachment part capable of being screwed only with the outer circumferential surface of the coil spring, the third embodiment is different from the first embodiment in that the hook member includes an attachment part capable of being screwed only with the inner circumferential surface of the coil spring. Other configurations are substantially the same as those in the first embodiment, so the configurations substantially the same as those in the first embodiment are denoted by the same reference numerals and the description thereof will be omitted.

<Hook Member>

The hook member 3, which is used for being attached to an end part of the coil spring 4 in its axial direction, includes a hook part 31 for hooking a target member and an attachment part 32 capable of being screwed with an inner circumferential surface 42 of the coil spring 4.

The hook part 31 of the hook member 3 may have an approximate C-shape as illustrated in FIG. 3(a), but the shape of the hook part 31 is not particularly limited, provided that the hook part 31 can hook a target member. For example, the hook part 31 may be in a circular shape.

In the third embodiment, the attachment part 32 of the hook member 3 may be in an approximately solid cylindrical shape extending in the same axial direction of the coil spring 4. The attachment part 32 has a sliding surface 322 slidable with the inner circumferential surface 42 of the coil spring 4, and the sliding surface 322 has a reverse shape of an inner circumferential surface 421 of the first turn constituting the coil spring 4.

The reverse shape of the inner circumferential surface 421 of the first turn constituting the coil spring 4 means a shape that engages with the inner circumferential surface 421 of the first turn of the coil spring 4, that is, an irregular shape obtained by reversing the outer shape so that the irregular shape can be screwed with the inner circumferential surface 421 of the first turn of the coil spring 4. The sliding surface 322 of the attachment part 32 may have the above reverse shape at the sliding surface 322 as a whole or at a part of the sliding surface 322, provided that the sliding surface 322 can be screwed with the inner circumferential surface 421 of the first turn of the coil spring 4.

In the third embodiment, as described above, the attachment part 32 of the hook member 3 may be in an approximately solid cylindrical shape extending in the same direction as the axial direction of the coil spring 4. The approximately solid cylindrical shape of the attachment part 32 of the hook member 3 allows the coil spring 4 to be applied with a uniform load even when the weight of a target member to be hooked on the hook member 3 is large, and the durability of the coil spring 4 can thus be improved.

As described above, in the third embodiment, the attachment part 32 of the hook member 3 may be in an approximately solid cylindrical shape, but the shape of the other portion is not particularly limited, provided that the sliding surface 322 slidable with the inner circumferential surface 42 of the coil spring 4 has a shape that engages with the inner circumferential surface 421 of the first turn constituting the coil spring 4 so that the shape can be screwed with the inner circumferential surface 42 of the coil spring 4. For example, the other portion than the attachment part 32 of the hook member 3 may be in any of various shapes, such as a flat plate-like shape extending in the same direction as the axial direction of the coil spring 4 and a cross shape obtained by combining flat shapes in the axial direction.

When the attachment part 32 of the hook member 3 is in a flat plate-like shape extending in the same direction as the axial direction of the coil spring 4, the manufacturing process can be simplified as compared with a case of manufacturing a hook member 3 including an attachment part 32 of a three-dimensional shape such as a protrusion shape, and it is therefore possible to suppress the manufacturing cost and achieve weight reduction. Moreover, when the hook member 3 as a whole including the hook part 31 and the attachment part 32 is in a flat plate-like shape extending in the same direction as the axial direction of the coil spring 4, it is possible to further simplify the manufacturing process and achieve further weight reduction.

As described above, the attachment part 32 of the hook member 3 can be screwed with the inner circumferential surface 42 of the coil spring 4; therefore, when the hook member 3 as a whole is in a flat plate-like shape extending in the same direction as the axial direction of the coil spring 4, the hook member 3 is in a flat plate-like shape that passes coaxially with the axial center of the coil spring 4 and has the same shape as the central longitudinal cross-sectional shape of the hook member 3 as illustrated in FIG. 3(a). In this case, the attachment part 32 of the hook member 3 has sliding surfaces 322 slidable with the inner circumferential surface 42 of the coil spring 4, and the sliding surfaces 322 have a shape that engages with the inner circumferential surface 421 of the first turn constituting the coil spring 4; therefore, the hook member 3 can be attached to the coil spring 4 by simply screwing the attachment part 32 with the inner circumferential surface 42 of the coil spring 4 while rotating the hook member 3.

When the attachment part 32 of the hook member 3 or the hook member 3 as a whole is in a flat plate-like shape extending in the same direction as the axial direction of the coil spring 4, the thickness of the flat plate portion can be appropriately set in accordance with a wire diameter d, an outer diameter Do, and a total number of turns of the coil spring 4 to be attached. For example, in the hook member 3 attached to the coil spring 4 having a wire diameter d of 1.08 mm, an outer diameter Do of 8.3 mm, and a total number of turns of 40, the flat plate portion may preferably have a thickness of about 2 to 3 mm.

In the third embodiment, a radial dimension R3 of the sliding surface 322 of the hook member 3 may be approximately the same as an inner diameter Di of the coil spring 4, and when the dimensional tolerance is Δ, the dimension R3 may be represented as R3=the inner diameter Di+ the dimensional tolerance Δ+ about 0.15 to 0.2. In the axial direction, a maximum dimension r3 of a recessed part 3221 formed by the sliding surface 322 of the hook member 3 may be approximately the same as the wire diameter d of the coil spring 4, and when the dimensional tolerance is Δ, the maximum dimension r3 may be represented as r3=the wire diameter d+ the dimensional tolerance Δ+ about 0.15 to 0.2. When the recessed part 3221 includes a left-side recessed part 3221a and a right-side recessed part 3221b in the central longitudinal cross-sectional view, the left-side recessed part 3221a may be disposed below the right-side recessed part 3221b in the axial direction with an elevational step corresponding to about half the wire diameter d of the coil spring 4.

The attachment part 32 of the hook member 3 may be formed with an end part 323 on the coil spring 4 side. The end part 323 has a so-called interference avoidance shape such that the second and subsequent turns of the coil spring 4 do not come into contact with the end part 323 when the spring is expanded and contracted. The interference avoidance shape refers, for example, to a shape in which a chamfer or an R surface is provided around the end part 323 on the coil spring 4 side of the attachment part 32. In the third embodiment, as illustrated in FIG. 3(a), a chamfered shape is employed as the interference avoidance shape of the end part 323. When a line drawn downward in the axial direction from a line shape center X of the first turn of the coil spring 4 corresponding to the sliding surface 322 is represented by a perpendicular line X', the chamfered shape is cut out at an angle of about 45 degrees radially inward from the line diameter center X with reference to the perpendicular line X'.

As a material of the hook member 3, for example, a metal, an alloy, a resin, or other appropriate material can be used, but from the viewpoint of the strength, a metal or an alloy may be preferred, and a stainless steel-based alloy may be particularly preferred. When an end part of the coil spring 4 in its axial direction is swaged and fixed to the attachment part 32 of the hook member 3 in the tension spring 30 as will be described later, the material of the hook member 3 may be preferably a metal or an alloy that can readily be plastically deformed and particularly preferably a copper-zinc-based alloy.

<Coil Spring>

In the third embodiment, the coil spring 4 is common to that in the first embodiment, so the description thereof will be omitted. The use of the hook member 3 in the present embodiment allows the effective number of turns of the coil spring 4 to be increased as compared with the conventional tension spring because no gaps are formed between the turns of the coil spring 4 not only when the hook member 3 is attached but also after the hook member 3 is attached.

<Tension Spring>

The tension spring 30 includes the coil spring 4 and the hook member 3 or a pair of the hook members 3 attached to one end part or both end parts of the coil spring 4 in its axial direction. As described above, the hook member 3 has the attachment part 32 capable of being screwed with the inner circumferential surface 42 of the coil spring 4, the attachment part 32 has the sliding surface 322 slidable with the inner circumferential surface 42 of the coil spring 4, and the sliding surface 322 has a reverse shape of the inner circumferential surface 421 of the first turn constituting the coil spring 4; therefore, the hook member 3 can be attached to the coil spring 4 simply by screwing the attachment part 32 of the hook member 3 with the inner circumferential surface 42 of the coil spring 4. Thus, according to the tension spring 30, even in a state in which turns of the coil spring 4 are kept in close contact with each other, the hook member 3 can be attached to the coil spring 4, and it is therefore possible to reduce the manufacturing time and suppress the manufacturing cost. That is, also in the third embodiment, the hook member 3 may not have a portion interposed between two successive turns of the coil in the state of being attached to the coil spring 4.

The present invention has been heretofore described with reference to the drawings, but the present invention is not limited to the above embodiments and can be carried out in various modified modes. In the above embodiments, the description is mainly made for the case where the hook member according to the present invention is attached to a so-called tension coil spring configured such that the turns of coil are in close contact with each other in a state in which the tensile force is not applied from external, but the hook member according to the present invention can also be used for being attached to a so-called compression coil spring that generates repulsion force when receiving a load in the direction in which the spring compresses. In the above embodiments, the description is made for the case where the attachment part of the hook member according to the present invention has the sliding surface or surfaces on the outer circumferential surface and/or inner circumferential surface of the coil spring and the sliding surface or surfaces have a reverse shape of the outer circumferential surface and/or inner circumferential surface of the first turn constituting the coil spring, but it suffices that the attachment part of the hook member according to the present invention has a reverse shape of the outer circumferential surface and/or inner circumferential surface of at least the first turn constituting the coil spring. For example, the attachment part may additionally have a reverse shape of the outer circumferential surface and/or inner circumferential surface of the second and subsequent turns constituting the coil spring.

DESCRIPTION OF REFERENCE NUMERALS

First Embodiment

1 Hook member
11 Hook part
12 Attachment part
121 Sliding surface (sliding surface with outer circumferential surface 41 of coil spring 4)
123 End part
1231 Swage part Second Embodiment Hook member
21 Hook part
22 Attachment part
221 Sliding surface (sliding surface with outer circumferential surface 41 of coil spring 4)
222 Sliding surface (sliding surface with inner circumferential surface 42 of coil spring 4)

223 End part
2231 Swage part
23 Protrusion part

Third Embodiment

3 Hook member
31 Hook part
32 Attachment part
322 Sliding surface (sliding surface with inner circumferential surface 42 of coil spring 4)
323 End part
4 Coil spring
41 Outer circumferential surface
411 Outer circumferential surface of first turn
42 Inner circumferential surface
421 Inner circumferential surface of first turn
d Wire diameter
Do Outer diameter
Di Inner diameter
10, 20, 30 Tension spring

The invention claimed is:

1. A hook member used for being attached to an end part of a coil spring in its axial direction, comprising:
  a hook part for hooking a target member; and
  an attachment part configured to be screwed with an outer circumferential surface of the coil spring,
  the attachment part having a sliding surface slidable with the outer circumferential surface of the coil spring, the sliding surface having a reverse shape of the outer circumferential surface of at least a first turn constituting the coil spring,
  wherein the attachment part is in a flat plate shape extending in a direction identical to the axial direction of the coil spring.

2. A hook member used for being attached to an end part of a coil spring in its axial direction, comprising:
  a hook part for hooking a target member; and
  an attachment part capable of being screwed with an outer circumferential surface of the coil spring,
  the attachment part having a sliding surface slidable with the outer circumferential surface of the coil spring, the sliding surface having a reverse shape of the outer circumferential surface of at least a first turn constituting the coil spring,
  wherein the attachment part is further capable of being screwed with an inner circumferential surface of the coil spring and has a sliding surface slidable with the inner circumferential surface of the coil spring, and the sliding surface has a reverse shape of the inner circumferential surface of at least the first turn constituting the coil spring.

3. A hook member used for being attached to an end part of a coil spring in its axial direction, comprising:
  a hook part for hooking a target member; and
  an attachment part configured to be screwed with an inner circumferential surface of the coil spring,
  the attachment part having a sliding surface slidable with the inner circumferential surface of the coil spring, the sliding surface having a reverse shape of the inner circumferential surface of at least a first turn constituting the coil spring,
  wherein the attachment part is in a flat plate shape extending in a direction identical to the axial direction of the coil spring.

4. A tension spring comprising:
  a coil spring; and
  a hook member or a pair of the hook members attached to one end part or both end parts of the coil spring in its axial direction,
  the hook member having: a hook part for hooking a target member; and an attachment part configured to be screwed with an outer circumferential surface of the coil spring,
  the attachment part having a sliding surface slidable with the outer circumferential surface of the coil spring, the sliding surface having a reverse shape of the outer circumferential surface of at least a first turn constituting the coil spring,
  wherein the attachment part of the hook member is in a flat plate shape extending in a direction identical to the axial direction of the coil spring.

5. The tension spring according to claim 4, wherein the end part or end parts of the coil spring in its axial direction are swaged and fixed to the attachment part or attachment parts of the hook member or hook members.

6. A tension spring comprising:
  a coil spring; and
  a hook member or a pair of the hook members attached to one end part or both end parts of the coil spring in its axial direction,
  the hook member having: a hook part for hooking a target member; and an attachment part capable of being screwed with an outer circumferential surface of the coil spring,
  the attachment part having a sliding surface slidable with the outer circumferential surface of the coil spring, the sliding surface having a reverse shape of the outer circumferential surface of at least a first turn constituting the coil spring,
  wherein the attachment part of the hook member is further capable of being screwed with an inner circumferential surface of the coil spring and has a sliding surface slidable with the inner circumferential surface of the coil spring, and the sliding surface has a reverse shape of the inner circumferential surface of at least the first turn constituting the coil spring.

7. A tension spring comprising
  a coil spring; and
  a hook member or a pair of the hook members attached to one end part or both end parts of the coil spring in its axial direction,
  the hook member having: a hook part for hooking a target member; and an attachment parts configured to be screwed with an inner circumferential surface of the coil spring,
  the attachment part having a sliding surface slidable with the inner circumferential surface of the coil spring, the sliding surface having a reverse shape of the inner circumferential surface of at least a first turn constituting the coil spring,
  wherein the attachment part of the hook member is in a flat plate shape extending in a direction identical to the axial direction of the coil spring.

* * * * *